United States Patent
Yu et al.

(10) Patent No.: US 10,785,676 B2
(45) Date of Patent: Sep. 22, 2020

(54) ELECTRONIC DEVICE AND TRAFFIC CONTROL METHOD THEREOF

(71) Applicant: Samsung Electronics Co., Ltd., Gyeonggi-do (KR)

(72) Inventors: Geum Hwan Yu, Gyeonggi-do (KR); Tae Gu Kim, Gyeonggi-do (KR); Woo Seok Jang, Seoul (KR); Joon Young Heo, Gyeonggi-do (KR); Gyu Joon Park, Gyeonggi-do (KR); Won Hee Seo, Gyeonggi-do (KR); Woo Kwang Lee, Gyeonggi-do (KR); Min Jung Kim, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 88 days.

(21) Appl. No.: 15/815,015

(22) Filed: Nov. 16, 2017

(65) Prior Publication Data

US 2018/0139645 A1    May 17, 2018

(30) Foreign Application Priority Data

Nov. 16, 2016 (KR) .................. 10-2016-0152915

(51) Int. Cl.
| | |
|---|---|
| *H04W 28/02* | (2009.01) |
| *H04W 72/10* | (2009.01) |
| *G06F 9/50* | (2006.01) |
| *H04L 29/08* | (2006.01) |
| *H04L 12/863* | (2013.01) |
| *H04L 12/851* | (2013.01) |
| *H04L 12/835* | (2013.01) |

(52) U.S. Cl.
CPC ....... *H04W 28/0268* (2013.01); *G06F 9/5011* (2013.01); *H04L 47/24* (2013.01); *H04L 47/621* (2013.01); *H04L 67/322* (2013.01); *H04W 72/10* (2013.01); *H04L 47/30* (2013.01)

(58) Field of Classification Search
None
See application file for complete search history.

(56) References Cited

U.S. PATENT DOCUMENTS

| | | | | |
|---|---|---|---|---|
| 4,100,601 | A * | 7/1978 | Kaufman | ................ G06F 11/10 370/463 |
| 8,238,911 | B2 | 8/2012 | D'Amore et al. | |
| 8,775,631 | B2 | 7/2014 | Luna | |
| 8,972,760 | B1 * | 3/2015 | Zajac | .................... G06F 1/3212 713/320 |
| 9,319,319 | B2 | 4/2016 | Doe et al. | |
| 2002/0163933 | A1 * | 11/2002 | Benveniste | ............ H04L 47/10 370/465 |

(Continued)

FOREIGN PATENT DOCUMENTS

WO   WO 2009/058154   5/2009

*Primary Examiner* — Ruihua Zhang
(74) *Attorney, Agent, or Firm* — The Farrell Law Firm, P.C.

(57) ABSTRACT

An electronic device is disclosed. The electronic device includes a memory configured to store processing rules of network traffic and a processor configured to determine an order where the network traffic is processed, depending on a rule to be applied, the rule corresponding to the at least one of app information of an application corresponding to at least one process which causes the network traffic, device state information, or network packet information among the processing rules.

18 Claims, 12 Drawing Sheets

(56) References Cited

U.S. PATENT DOCUMENTS

| | | | |
|---|---|---|---|
| 2004/0076161 A1* | 4/2004 | Lavian | H04L 47/10 |
| | | | 370/395.41 |
| 2005/0047343 A1* | 3/2005 | Sharony | H04L 47/10 |
| | | | 370/235 |
| 2008/0144493 A1* | 6/2008 | Yeh | H04W 52/50 |
| | | | 370/230 |
| 2009/0119773 A1* | 5/2009 | D'Amore | G06F 9/5011 |
| | | | 726/21 |
| 2013/0315064 A1 | 11/2013 | Doe | |
| 2014/0018033 A1 | 1/2014 | Luna | |
| 2014/0162726 A1* | 6/2014 | Dong | G06K 19/0701 |
| | | | 455/558 |
| 2015/0124617 A1 | 5/2015 | Luna | |
| 2017/0104633 A1* | 4/2017 | Wen | H04W 24/08 |
| 2017/0188273 A1* | 6/2017 | Yiu | H04W 36/04 |
| 2017/0235673 A1* | 8/2017 | Patel | G06F 3/0608 |
| | | | 711/159 |

* cited by examiner

PRIORITY DATA PROCESSING o GAME
o EDUCATION
o FINANCE
o NAVIGATION
o VIDEO

FIG.1B

LIST OF DEVICES CONNECTED
FOR PRIORITY DATA PROCESSING

○ GALAXY GEAR
○ GEAR VR
○ Samsung TV
○ XX Speaker
  . . .

FIG.1C

ELECTRONIC DEVICE AND TRAFFIC CONTROL METHOD THEREOF

PRIORITY

This application claims priority under 35 U.S.C. § 119(a) to a Korean Patent Application filed in the Korean Intellectual Property Office on Nov. 16, 2016 and assigned Serial Number 10-2016-0152915, the contents of which are incorporated herein by reference.

BACKGROUND

1. Field of the Disclosure

The present disclosure generally relates to an electronic device for controlling network traffic and a traffic control method thereof.

2. Description of the Related Art

Many users send a variety of content, such as high-resolution photo files, videos, and music streaming data, using communication of their electronic devices.

A conventional electronic device may sequentially control traffic using a basic traffic control scheme of first in first out (FIFO) such that a process with low importance excessively occupies a network.

There are many elements which reduce network traffic until network traffic of an electronic device is transmitted and received as radio waves through several stages from a baseband. Such traffic deterioration may cause deterioration in file transfer rate, buffering occurrence of streaming images, a loading delay of web pages, and the like. If network traffic with a relatively high priority is more quickly processed, traffic deterioration may be somewhat reduced or a user may feel less traffic deterioration.

SUMMARY

Aspects of the present disclosure address at least the above-mentioned problems and/or disadvantages and to provide at least the advantages described below. Accordingly, an aspect of the present disclosure is to provide an electronic device for controlling an order where network traffic is processed and a traffic control method thereof.

An aspect of the present disclosure is to enhance a delay of network traffic with high importance by controlling an order where network traffic is processed.

In accordance with an aspect of the present disclosure, an electronic device includes a memory, configured to store processing rules of network traffic; and a processor configured to verify at least one information of app information of an application corresponding to at least one process which causes the network traffic, device state information, or network packet information, and to determine an order where the network traffic is processed, based on a rule to be applied, the rule corresponding to the at least one information, among the processing rules.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1B is a screen illustrating a user interface for setting a favorite category according to embodiments of the present disclosure;

FIG. 1C is a screen illustrating a user interface for setting a preference for each peripheral device according to embodiments of the present disclosure;

Throughout the drawings, it should be noted that like reference numbers are used to depict the same or similar elements, features, and structures.

DETAILED DESCRIPTION OF EMBODIMENTS OF THE DISCLOSURE

Hereinafter, certain embodiments of the present disclosure are described with reference to accompanying drawings. Accordingly, those of ordinary skill in the art will recognize that modifications, equivalents, and/or alternatives on the embodiments described herein may be made without departing from the scope and spirit of the present disclosure.

The terms of a singular form may include plural forms unless otherwise specified. In the present disclosure, the expressions "A or B", "at least one of A and/or B", "A, B, or C", or at least one of "A, B and/or C" may include all possible combinations of one or more of the associated listed items. Terms such as "first", "second", and the like used herein may refer to various elements regardless of the order and/or priority of the elements and may be used to distinguish an element from another element, not to limit the elements. It will be understood that when an element, such as a first element, is referred to as being "(operatively or communicatively) coupled with/to" or "connected to" another element, such as a second element, the first element may be directly coupled with/to or connected to the second element or an intervening element, such as a third element, may be present there between.

In the present disclosure, according to the situation, the expression "adapted to or configured to" used herein may be interchangeably used with the expressions "suitable for", "having the capacity to", "changed to", "made to", "capable of", or "designed to" "adapted to", "made to", or "capable of". Under a certain situation, the expression "a device configured to" may indicate that the device is "capable of" operating together with another device or other components. A "processor configured to (or adapted to) perform A, B, and C" may indicate a dedicated processor or an embedded processor for performing a corresponding operation or a generic-purpose processor, such as a central processing unit (CPU) or an application processor (AP) which may perform corresponding operations by executing one or more software programs which are stored in a memory device.

Figure 1A:
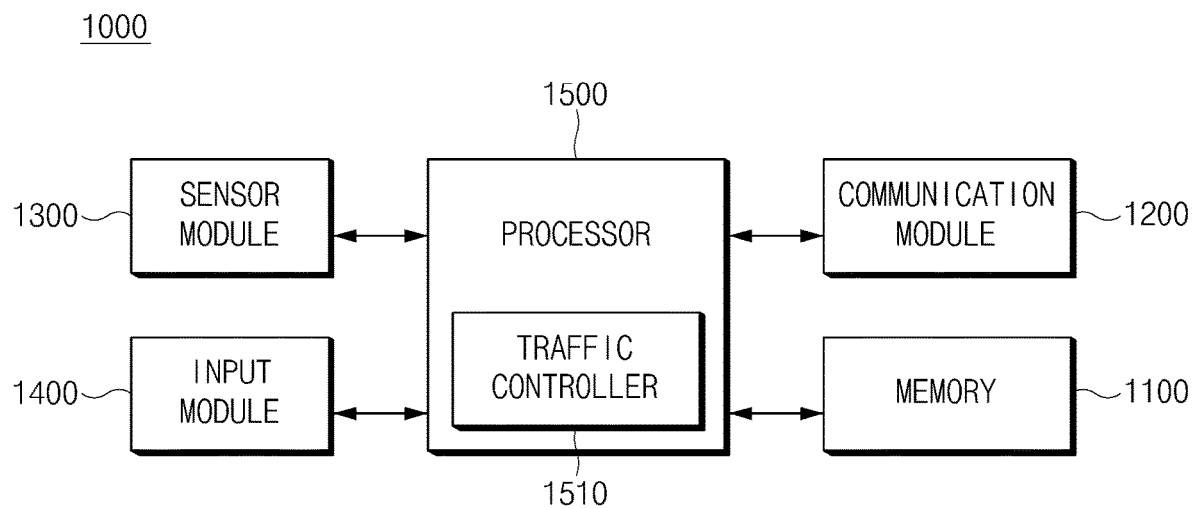
FIG. 1A is a block diagram illustrating a configuration of an electronic device according to embodiments of the present disclosure.

FIG. 1A is a block diagram illustrating a configuration of an electronic device according to embodiments of the present disclosure. FIG. 1B is a screen illustrating a user interface for setting a favorite category according to embodiments of the present disclosure. FIG. 1C is a screen illustrating a user interface for setting a preference for each peripheral device according to embodiments of the present disclosure.

As shown in FIG. 1A, an electronic device 1000 according to embodiments of the present disclosure may include a memory 1100, a communication module 1200 (or a communication circuit), a sensor module 1300 (or a sensor), an input module 1400, and a processor 1500. In embodiments, the electronic device 1000 may not include some of the elements or may include other element(s). Alternatively, some of the elements may be combined to be configured as one entity, and a function of each of the elements before the combination may be performed in the same manner.

The memory 1100 may be a volatile memory, such as a random access memory (RAM) or the like, a non-volatile memory, such as a read only memory (ROM), a flash memory, or the like, or a combination thereof. The memory 1100 may store instructions or data associated with at least one other element of the electronic device 1100. According to embodiments, the memory 1100 may store a rule chain. The rule chain may be a set of control rules of network traffic classified according to a theme (or category) and may include a basic rule group and a plurality of expansion rule groups, for example, first to fourth rule groups. Hereinafter, the basic rule group and the first to fourth rule groups will be separately described. A rule, a rule chain, and a plurality of rule groups, which will be described hereafter (in FIGS. 1A to 8) may be written (implemented) by instructions or data explicitly classified in the electronic device 1000, such as a software program, or may fail to be written (implemented) by the instructions or data. For example, an operation of each rule, such as a control rule of network traffic for each situation, described in the present disclosure may be implemented with a sequential code, such as a branch statement or the like on the traffic controller 1510. For example, a rule group operated in the traffic controller 1510 may conceptually exist.

In embodiments of the present disclosure, the basic rule group may include a rule which specifies a faster processing order as larger in an amount of traffic generated from an application which generates network traffic. The amount of generated traffic may be an average (or accumulated) transmission and reception amount of packets per unit time, such as 1 hour, of each transceiver included in the communication module 1200 and may be calculated by the processor 1500. The basic rule group may be a rule set to a default.

In embodiments of the present disclosure, an application corresponding to a rule of the first rule group may have a relatively highest priority, and an application corresponding to a rule of each of the second to fourth rule groups may have a middle priority or a relatively lowest priority.

In embodiments of the present disclosure, the first rule group may include a hidden rule. The hidden rule may be a rule which is not opened to a user and may be a rule set by a device manufacturer. A rule included in the first rule group may be set to a default without a setting of the user. Hereinafter, a description will be given of each rule. As a first embodiment, the hidden rule may include a rule of assigning an application necessary for ensuring real time to a first queue with a highest priority among queues, such as data communication queues, according to a plurality of priorities, each of which has a different priority, on a kernel 1520 of FIG. 3. The queues according to the plurality of priorities may be specified to classify a priority where a network packet of an application is processed. Among the queues according to the plurality of priorities, the first queue may be a queue with a highest priority where a traffic control command is processed.

Hereinafter, a description will be given of an example in which the queues according to the plurality of priorities include first to third queues and in which each of the first to third queues has a sequential priority. The application necessary for ensuring the real time may be a video call, such as a video telephony (VT) call, a voice call, such as a voice over long term evolution (VoLTE) call or a voice wireless fidelity (VoWiFi) call, sound source or video streaming, such as a sound source or video playback through YouTube, a text message, and/or the like. The hidden rule may include a rule of assigning a special packet of bidirectional communication to the first queue. The special packet may be a control packet of a network protocol, such as a transmission control protocol (TCP). For example, the special packet may include a control flag (e.g., URG, ACK, PSH, RST, SYN, FIN, or the like) or a reserved packet. The special packet may be produced based on header information of the network protocol, such as the TCP and may be selected among packets transmitted to a network by the processor 1500 to adjust (or optimize) a data throughput. As a third embodiment, the hidden rule may include a rule of assigning network traffic generated from an application specified by a manufacturer to the first queue. The application specified by the manufacturer may be determined according to, for example, a concept of the electronic device 1000. For example, if the electronic device 1000 has a concept of emphasizing video streaming, the hidden rule may include a rule of assigning network traffic corresponding to the video streaming to the first queue. Each of the rules described by the first to third embodiments, included in the first rule group, may have a sequential processing order, (e.g., the rule of the first embodiment>the rule of the second embodiment>the rule of the third embodiment). An order where each of the rules included in the first rule group may be set in a different way from the sequential processing order. The processing order may be, for example, an order where the processor 1500 generates (or transmits) a traffic control command for each network traffic.

In embodiments of the present disclosure, the second rule group may include rules for optimizing performance of an application. Each of the rules included in the second rule group may be a rule set to a default without a user setting. Hereinafter, a description will be given of each rule. As a first embodiment, the second rule group may include a rule of assigning network traffic generated from an application, execution state of which is a foreground state, to a second queue in a fixed manner. The second queue may be a queue having a second high priority in which a traffic control command for the network traffic of the application is processed. The second rule group may include a rule of assigning network traffic generated from an application, an execution state of which is a background state, to a third queue in a fixed manner. The third queue may be a queue having the lowest priority in which a traffic control command for the network traffic of the application is processed. As a second embodiment, the second rule group may include a rule of assigning network traffic generated from an application which communicates with a peripheral device to the second queue if the electronic device 1000 is connected with the peripheral device. The peripheral device may include a device, such as a virtual reality (VR) experience device, such as a Samsung gear VR, a drone, or a wearable device, which is connected to the communication module 1200 over a wired/wireless interface and generates network traffic. The rules described by the first and second embodiments, included in the second rule group, may have a sequential processing order (e.g., the rule of the first embodiment>the rule of the second embodiment). This is only one embodiment, but an order in which the rules included in the second rule group are processed may be operated in various manners based on a corresponding embodiment.

In embodiments of the present disclosure, the third rule group may include a rule for enhancing a taste of the user and availability of the electronic device 1000. The rule included in the third rule group may be a rule which is not set to a default and is applied according to a user setting. Hereinafter, a description will be given of the rule included in the third rule group. As a first embodiment, the third rule group may include a rule of assigning network traffic generated from an application of a user favorite category to a second queue. The category may be a category of classifying an application for each function, for example, may comply with an app category of Google. For example, the category may be "game", "education", "finance", "weather", "health/exercise", "map/navigation", or the like. Referring to FIG. 1B, the user favorite category may be a category set as the user selects at least one category he or she prefers (e.g., at least one of "game", "education", "finance", "navigation", or "video") in an interface of setting a favorite category including a category name of an application in the electronic device 1000. As a second embodiment, if there is a specified traffic limit, the third rule group may include a rule of blocking (or limiting) remaining network traffic except for a permission application set by the user. The traffic limit may be a threshold limit according to a communication tariff verified from communication information, such as a short message service (SMS), a mobile network operator (MNO) site, or an MNO app. The threshold limit may be increased or decreased according to a high tariff and may be obtained from an MNO site, or an MNO app. For another example, the traffic limit may be a value of less than the threshold limit set by the user. As a third embodiment, the third rule group may include a rule of assigning network traffic from an application corresponding to a specific situation, such as a situation during movement to a second queue. For example, an application corresponding to a situation during movement of the electronic device 1000 may be an application included in a map/navigation category. For another example, an application corresponding to a situation during exercise of the electronic device 1000 may be an application included in a health/exercise category. As a fourth embodiment, the third rule group may include a rule of assigning network traffic from an application set to a taste application in a specific location, such as a home, company, or school, of the electronic device 1000 to the second queue. As a fifth embodiment, the third rule group may include a rule of primarily assigning network traffic corresponding to a peripheral device to the second queue in a processing order set by the user with respect to several peripheral devices which are connected to the electronic device 1000 by a tethering function (or a mobile hotspot function) and use a network via the electronic device 1000 and assigning the remaining network traffic to a third queue upon excess of an assignment limit of the second queue. Referring to FIG. 1C, an order in which network traffic of each of a plurality of peripheral devices connected to the electronic device 1000 is processed may be set through an interface where the user inputs preference of each of the plurality of peripheral devices connected to the electronic device 1000. For example, if the user selects one of the plurality of connected peripheral devices, the electronic device 1000 may assign network traffic corresponding to the selected device to a queue, such as the first queue or the second queue, having a relatively high priority. As a sixth embodiment, when the electronic device 1000 is in a specified mode, such as a car mode, a kids mode, or a private or guest mode, the third rule group may include a rule of assigning network traffic from at least one application operated in the mode to the second queue. The car mode may be a mode set such that the user easily uses a function of the electronic device 1000 during driving. An application operated in the car mode may be a navigation of a map/navigation category. For example, the kids mode may be a mode in which a child uses the electronic device 1000. An application operated in the kids mode may be an application for preventing executing an X-rated application or blocking a connection to the X-rated application. The private or guest mode may be a mode set such that another user rather than an owner of the electronic device 1000 temporarily use the electronic device 1000. An application operated in the private or guest mode may be an application for preventing personal information from being hacked. The application operated for each mode may be specified by a manufacturer or the user. As a seventh embodiment, the third rule group may include a rule of blocking network traffic from an application set by the user. The rules respectively described by the first to seventh embodiments, included in the third rule group, may have a sequential processing order (e.g., the rule of the first embodiment>the rule of the second embodiment>the rule of the third embodiment>the rule of the fourth embodiment>the rule of the fifth embodiment>the rule of the sixth embodiment>the rule of the seventh embodiment). This is only one embodiment, but an order where each of the rules included in the third rule group is processed may be operated in various manners based on the corresponding embodiment.

In embodiments of the present disclosure, the fourth rule group may include a rule for minimizing current consumption and/or heating of the electronic device 1000. The rule included in the fourth rule group may be a rule, a setting of which is changed according a situation of the electronic device 1000, such as a remaining capacity of a battery of the electronic device 1000, a power-saving mode or an ultra power-saving mode, a heating state, or the like. As a first embodiment, if a remaining capacity of the battery of the electronic device 1000 is less than a specified remaining capacity, the fourth rule group may include a rule of blocking network traffic from an application except for an application according to a hidden rule. The specified remaining capacity may be a specified rate, such as 10%, of a total battery capacity and may be changed and set by the user. As a second embodiment, the fourth rule group may include a rule of blocking network traffic generated from an application except for a specified application depending on a power-saving mode or an ultra power-saving mode. For example, the fourth rule group may include a rule of blocking network traffic from an application except for an application according to a hidden rule in the power-saving mode. For another example, the fourth rule group may include a rule of blocking network traffic except for network traffic from an application, such as real time, of a priority value of the highest processing priority or a specified priority or more among applications according to a hidden rule in the ultra power-saving mode. In a fourth embodiment, if a heating temperature of the electronic device 1000 is greater than or equal to a specific threshold value, the fourth rule group may include a rule of blocking network traffic generated from an application except for a specified application.

According to embodiments of the present disclosure, the memory 1100 may store a current rule set for controlling a priority of network traffic. The current rule set may be a set of application rules determined in response to an application, device state information, device connection information, and user setting information in a rule chain by the processor 1500. For example, the current rule set may be a set of rules to be applied in the rule chain. A process of selecting the current rule set from the rule chain at the processor 1500 will be described concurrently with describing the processor 1500.

The communication module 1200 may include at least one transceiver for a variety of communication such as mobile communication, wireless-fidelity (Wi-Fi), and Bluetooth. For example, the mobile communication may provide a voice call, a video call, a text service, an Internet service, or the like in various communication modes such as third generation (3G), 4G (long term evolution (LTE)), and global system for mobile communication (GSM). According to various embodiments, the communication module 1200 may transmit and receive network traffic of an application installed in the electronic device 1000, depending on an instruction of the processor 1500. For example, the network traffic may be a transmitted and received network packet. The communication module 1200 may provide communication information about a connection of a peripheral device connected to the electronic device 1000.

The sensor module 1300 may include at least one (device state information) of a battery sensor (or a battery remaining capacity sensing circuit), a temperature sensor, a global positioning system (GPS) module, an acceleration sensor, an illumination sensor, an electric field sensing circuit, or a touch sensor. The battery sensor may sense a remaining capacity of the battery of the electronic device 1000. The temperature sensor may measure a temperature of the electronic device 1000. The GPS module may calculate a current location of the electronic device 1000 based on a GPS signal. The illumination sensor may sense intensity of illumination around the electronic device 1000. The electric field sensing circuit may sense electric field information, such as a received signal strength indication (RSSI). For example, the electric field information may be an RSSI of the communication module 1200. The touch sensor may sense information about a touch region of the user. The touch sensor may be used as part of the input module 1400, such as a touch panel. The sensor module 1300 may sense a state of the electronic device 1000 and may output the sensed information. The sensed information may include at least one of a remaining capacity of the battery, location information, electric field information, and environment information, such as intensity of illumination or information about whether a touch or grip occurs.

The input module 1400 may include a touch panel, a (digital) pen sensor, a key, or an ultrasonic input unit. The input module 1400 may provide a user setting interface for controlling a priority of network traffic from an application.

The processor 1500 may include at least one of CPU, a graphic processing unit (GPU), a microprocessor, an application specific integrated circuit (ASIC), or a field programmable gate array (FPGA) and may have a plurality of cores. The processor 1500 may perform an arithmetic operation or data processing associated with control and/or communication of at least one other element of the electronic device 1000.

According to embodiments of the present disclosure, the processor 1500 may analyze at least one of an application associated with occurrence of network traffic, device state information, device connection information, or user setting information. For example, if verifying an application which generates network traffic among executing applications, the processor 1500 may analyze app information of the application. The app information may include at least one of an amount of traffic generated for each application, an execution state, a characteristic, a type, or a category. The processor 1500 may verify at least one of a specific situation, a specific location, a specific mode, a low battery, arrival of a traffic limit, or whether a peripheral device is connected, using at least one of sensing information from the sensor module 1300 or communication information from the communication module 1200. For example, the specific mode may be verified as a mode set in the electronic device 1000 is verified. The low battery may be a state where a remaining capacity of the battery is less than or equal to a specified value. The processor 1500 may verify a user setting for a favorite function including at least one of a favorite category, a user favorite peripheral device, and a favorite application for each location, through the input module 1400.

According to embodiments of the present disclosure, the processor 1500 may include the traffic controller 1510 for controlling a priority of network traffic. For example, the traffic controller 1510 may verify an amount of traffic generated from an application based on a basic rule group and may temporarily determine an order where network traffic of an application is processed, in an order whether there is a large amount of generated traffic. After temporarily determining the order where the network traffic is processed, the traffic controller 1510 may change the order where the network traffic is processed, using rules included in the first to fourth rule groups. For example, the traffic controller 1510 may select a rule corresponding to a criterion of at least one of app information of an application, device state information, device connection information, or user setting information from the first to fourth rule groups. The traffic controller 1510 may compare the selected rule with a rule according to a current rule set stored in the memory 1100. If the selected rule is different from the rule according to the current rule set, the traffic controller 1510 may update the current rule set stored in the memory 1100 to correspond to a rule selected as a rule of the current rule set stored in the memory 1100 is added or deleted. The traffic controller 1510 may change an order where network traffic of an application is processed, depending on the rule of the current rule set.

In embodiments of the present disclosure, the traffic controller 1510 may determine a priority (a queue to be assigned) in which network traffic of an application is processed, depending on a rule of the updated current rule set. The traffic controller 1510 may generate a traffic control command to transmit each network traffic in the changed order where the network traffic is processed and assign the network traffic to a queue for each priority of a kernel, such as kernel 1520 of FIG. 3, corresponding to the determined priority. The traffic control command may be a command to control a priority of network traffic as the kernel assigns a queue for each priority per transceiver included in the communication module 1200 and inputs network traffic to the queue for each priority depending on the determined priority. A description will be given below of details of the traffic controller 1510 with reference to FIG. 2.

In embodiments of the present disclosure, network traffic having a high priority in network traffic may be primarily processed to effectively use network traffic in consideration of various states and situations of an electronic device.

Figure 2:
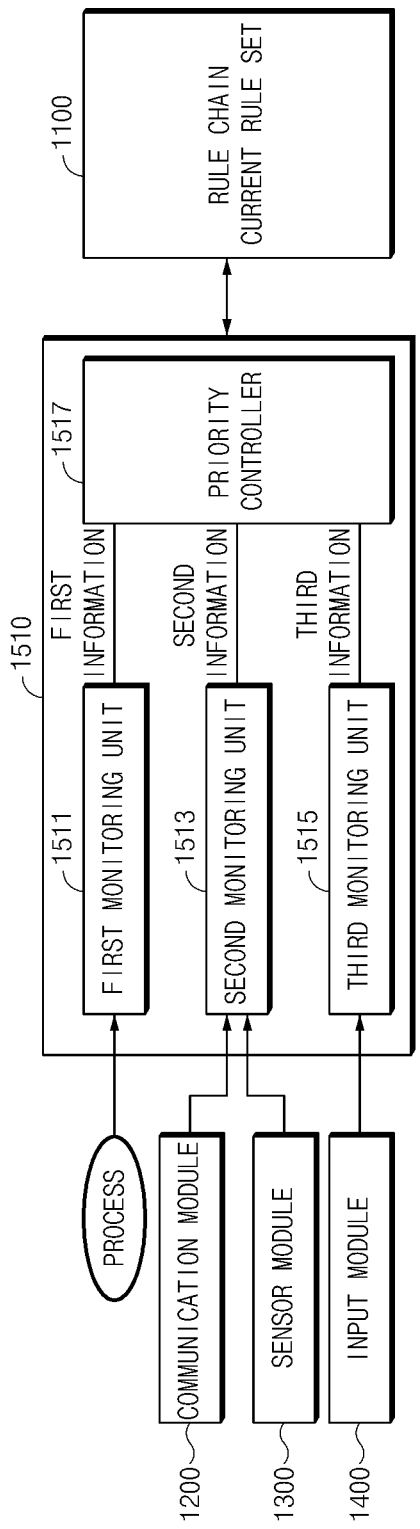
FIG. 2 is a block diagram illustrating a configuration of a traffic controller according to embodiments of the present disclosure.
Figure 3:
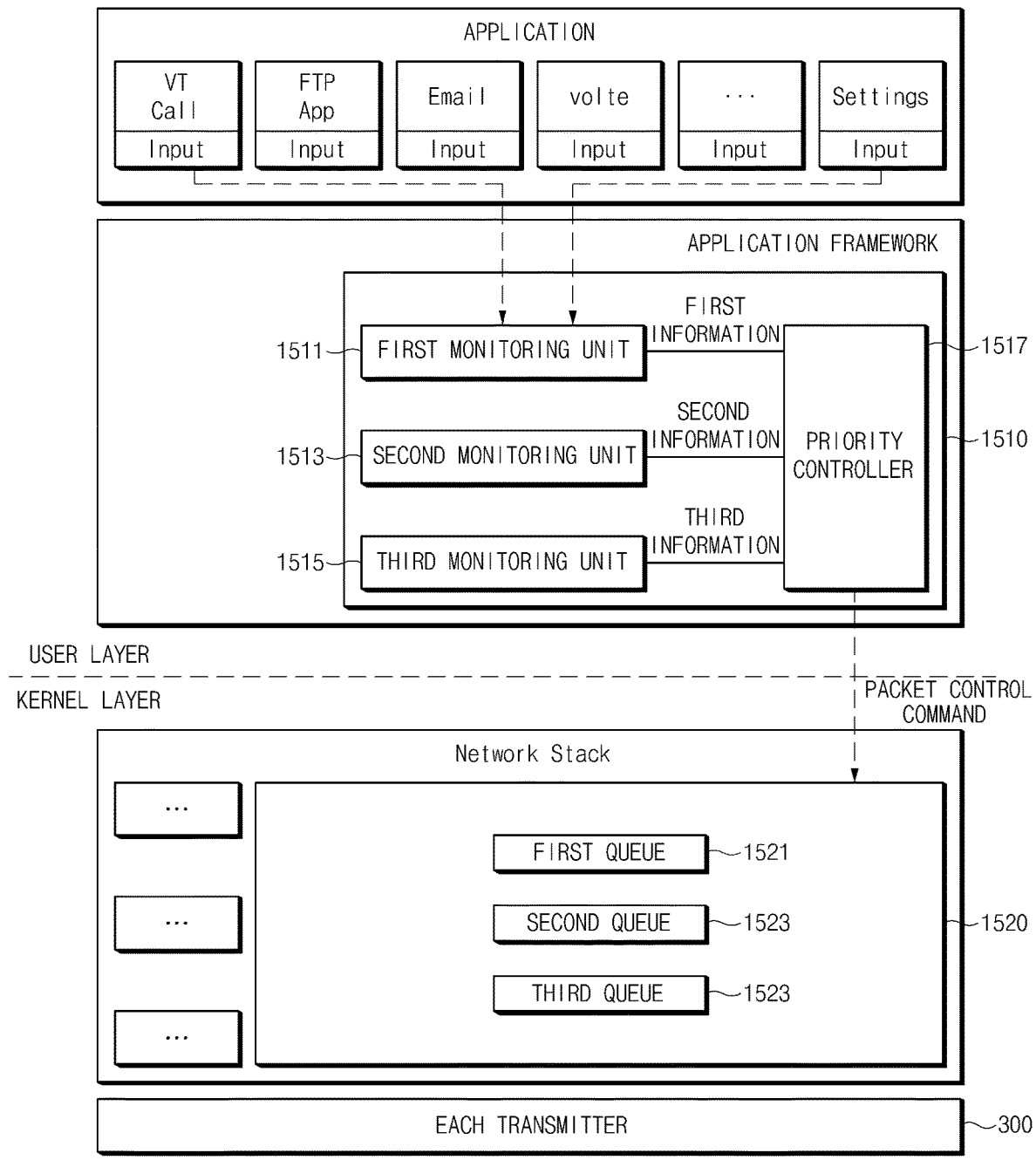
FIG. 3 is a block diagram illustrating a configuration of a processor according to embodiments of the present disclosure.

FIG. 2 is a block diagram illustrating a configuration of a traffic controller according to embodiments of the present disclosure. FIG. 3 is a block diagram illustrating a configuration of a processor according to embodiments of the present disclosure. For convenience of description, FIG. 2 illustrates some of elements which interact with a processor. In the specification including FIG. 2, an embodiment is exemplified as queues including first to third queues 1521, 1523, and 1525 are used. However, the number of queues for each priority is not limited thereto.

Referring to FIG. 2, a traffic controller 1510 according to embodiments of the present disclosure may include a first monitoring unit 1511, a second monitoring unit 1513, a third monitoring unit 1515, and a priority controller 1517. Each of the elements of the traffic controller 1510 may be a separate hardware module or a software module implemented by at least one processor. For example, functions performed by respective modules included in the traffic controller 1510 may be performed by one processor or may be performed by separate processors, respectively. Referring to FIG. 3, the first monitoring unit 1511, the second monitoring unit 1513, the third monitoring unit 1515, and the priority controller 1517 may be located on an application framework layer and may be configured in the form of one module.

According to embodiments of the present disclosure, the first monitoring unit 1511 may monitor an executing application (or process) and may analyze information of an application which generates network traffic among applications. For example, the first monitoring unit 1511 may analyze at least one app information among an amount of traffic generated from an application, an execution state of the application, a characteristic, such as real time, of the application, a type, such as a network protocol, of the application, or a category of the application. The amount of generated traffic may be calculated as an average (or accumulated) amount of packets transmitted and received during a constant period of time, such as 1 day. The execution state of the application may include a foreground state and a background state. The foreground state may be classified as an active state or an inactive state. The active state may be a state where an application occupies a screen of a display and where it is possible for the application to process an event of a user. The inactive state may be a state where the application occupies a screen of the display, but where it is impossible for the application to process an event of the user. The background state may be a state where the application does not occupy a screen of the display, but where the application occupies at least part of the memory 1100. A priority for each execution state of the application may be an order of a foreground active state, a foreground inactive state, and a background state. The characteristic of the application may be a characteristic due to use of the application, such as real time, non-real time, or the like. For example, an application having real time may be an app which provides a service such as a video call, a voice call, video streaming, text, or a messenger. For another example, an application having non-real time may be a web browser, a mail, or the like. The type of the application may be verified from header information of a network protocol. The first monitoring unit 1511 may separately select a special packet among network packets using header information of an application corresponding to the processor. Hereinafter, information of the special packet is described as being included in app information. As described above, the special packet may be produced based on header information of a network protocol, such as TCP, of an application and may be selected among packets transmitted to a network at the application to adjust (or optimize) a data throughput. For example, the special packet may be Sync, ACK, PUSH, FIN, or the like. The first monitoring unit 1511 may generate first information including unique information of an application (or process) arranged in a specified processing order. The specified processing order may be determined according to a rule of a basic rule group, such as, an order where there is a large amount of traffic generated from an application. The unique information may include at least one of a process identifier (ID), an internet protocol (IP) address, or a port number. The first information may include app information associated with the unique information of the application.

According to embodiments of the present disclosure, the second monitoring unit 1513 may generate second information including device state information and device connection information based on at least one of sensing information of a sensor module 1300 or communication information of a communication module 1200. The sensing information may include at least one of a remaining capacity of a battery, location information, electric field information, or environment information, such as intensity of illumination or information about whether a touch occurs. The communication information may include at least one of, information about the number of peripheral devices connected with an electronic device 1000 of FIG. 1 through tethering or a mobile hotspot or a specified traffic limit Thus, the second monitoring unit 1513 may verify a connection with another peripheral device and a traffic limit using the communication information. The device state information may be at least one of electric field strength, information about whether the electronic device 100 is in a specified location, information about whether the electronic device 1000 is in a specified situation, such as a situation during movement or exercise, a low battery, or information about whether the electronic device 1000 is in a specific mode. For example, the second monitoring unit 1513 may verify whether the electronic device 1000 is during movement, whether the electronic device 1000 is during exercise, or whether the electronic device 1000 is in a specified location, using at least one of sensing information of an acceleration sensor, a current location of a GPS module, or electric field information, such as base station information. For another example, the second monitoring unit 1513 may verify a remaining capacity of a battery to verify whether the electronic device 1000 has a low battery. For another example, the second monitoring unit 1513 may verify mode changes of a processor 1500 of FIG. 1A to verify a specific mode. The specified location may be a location specified via an input module 1400, such as a home, a company, or a school. The specified situation may be a situation where a grip on a screen of a display of a user is verified through a touch sensor. The mode may be a mode associated with a remaining capacity of a battery, such as a power-saving mode or an ultra power-saving mode. The mode may be a mode associated with a location or the user, such as a car mode, a kids mode, or a private or guest mode. The second monitoring unit 1513 may generate second information including all information verified between device connection information and device state information. Alternatively, the second monitoring unit 1513 may generate second information which selectively includes necessary information between another device connection information and another device state information. For example, if a remaining capacity of a battery is greater than or equal to a specified remaining capacity, the second monitoring unit 1513 does not include the remaining capacity of the battery in the second information. If the remaining capacity of the battery is less than the specified remaining capacity, the second monitoring unit 1513 may include the remaining capacity of the battery in the second information. For another example, if electric field strength is low, the second monitoring unit 1513 may include electric field information, such as electric field strength, in the second information. For another example, if the electronic device 1000 exists on a specific location, the second monitoring unit 1513 may include location information in the second information.

According to embodiments of the present disclosure, the third monitoring unit 1515 may monitor the input module 1400 and a memory 1100 to verify a favorite function set by the user for each group or for each application. The third monitoring unit 1515 may generate third information which includes unique information of an application included in a group set by the user, unique information of an application included in a favorite category, and unique information of a favorite application.

According to embodiments of the present disclosure, the priority controller 1517 may collect and analyze at least one of the first information, the second information, or the third information. For example, the priority controller 1517 may collect and analyze at least one of the first information, the second information, or the third information on a periodic basis. The priority controller 1517 may select a rule corresponding to at least one of the first information, the second information, or the third information monitored from a rule chain. For example, the priority controller 1517 may select a rule associated with at least one of app information of an application, device state information, device connection information, or user setting information from the rule chain. For example, if verifying that an application has real time from app information, the priority controller 1517 may select a rule of assigning network traffic (or a network packet) of the application having the real time to a first queue 1521 from a first rule group. For another example, if verifying the electronic device 1000 is moving from device state information, the priority controller 1517 may select a rule of assigning a faster processing order to network traffic of an application of a map/navigation category in a moving situation among executing applications.

According to embodiments of the present disclosure, the priority controller 1517 may rearrange unique information of applications arranged to have a processing order according to an amount of generated traffic by the first monitoring unit 1511 to fit a processing order according to a selected rule. As a first embodiment, if an application according to a rule of at least one first rule group, such as a rule included in a first rule group, is verified among an application in which real time should be ensured, an application which accompanies a special packet of bidirectional communication, and an application specified by a manufacturer, the priority controller 1517 may change a processing order such that the application according to the rule of the first rule group is relatively quickly processed. The processing order may be specified in an order of the application in which the real time should be ensured, the application which accompanies the special packet of the bidirectional communication, and the application specified by the manufacturer. The special packet of the bidirectional packet may be verified through a type, such as a network protocol, among app information. Thus, embodiments of the present disclosure may quickly process traffic, such as a special packet, for bandwidth allocation of bidirectional communication or the like to increase a communication speed of bidirectional communication. Certain embodiments may quickly process network traffic which needs real time and traffic according to a device concept to obtain an effect of allowing the user to feel less traffic speed degradation.

As a second embodiment, if verifying at least one of an application, an execution state of which is a foreground state, and an application which communicates with a peripheral device from at least one of first information (e.g., app information) or second information (e.g., device connection information), the priority controller 1517 may change a processing order such that the verified application is second processed subsequent to an application according to a rule included in the first rule group. The processing order may be specified in an order of the application, the execution state of which is the foreground state, and the application which communicates with the connected peripheral device. This is only one embodiment, and the present disclosure is not limited thereto. Thus, embodiments more quickly process network traffic of an application which is currently being executed by the user such that he or she may feel that a traffic speed is enhanced.

As a third embodiment, if verifying at least one of application ① included a user favorite category, such as "game", "education", "finance", or "weather", application ② included in a category associated with a specific situation, such as a situation during movement or a situation during exercise, of a device, application ③ set to a favorite application at a specific location, such as a home, a company, or a school, application ④ corresponding to a peripheral device the user prefers if several peripherals are connected, or specified application ⑤ associated with a specific mode, such as a car mode, a kids mode, or a private or guest mode, from at least one of first information, such as app information, second information, such as device state information or device connection information, or third information, such as a favorite category or a favorite application for each location, the priority controller 1517 may change a processing order such that network traffic of the verified application is third processed subsequent to a rule of a rule group and a rule of a second rule group. An order where applications to be third processed are processed may be specified as an order of application ①, application ②, application ③, application ④, and application ⑤. This is only one embodiment, and the present disclosure is not limited thereto. Thus, embodiments may enhance satisfaction of the user with a network speed by primarily processing traffic of an application suitable for a taste or situation of the user.

According to embodiments, the priority controller 1517 may sequentially generate a traffic control command from a traffic control command for network traffic of the earliest application in the changed processing order. The traffic control command may be a command executed by a kernel 1520 and may be a command including information about a queue to which network traffic will be assigned. The traffic control command may use a rule algorithm, such as FIFO, PRIORITY, or CLASSIFY, for managing a bandwidth of the kernel 1520. The priority controller 1517 may assign network traffic of an application to be first processed (corresponding to a rule of the first rule group) to the first queue 1521 having the highest processing priority. The priority controller 1517 may primarily assign network traffic of an application to be second processed (corresponding to the rule of the second rule group) and network traffic of an application to be third processed (corresponding to a rule of a third rule group) to a second queue 1523 having a middle processing priority. If network traffic of an application is greater than a processing limit of traffic for each priority for the second queue 1523, the priority controller 1517 may assign the network traffic of the application to a third queue 1525 having the lowest processing priority. The processing limit of the traffic for each priority may be calculated in consideration of capacity of a queue included in the kernel 1520 and processing performance of the kernel 1520.

According to embodiments, the kernel 1520 may assign and manage a queue for each priority corresponding to a transceiver corresponding to a traffic control command among transceivers included in the communication module 1200 depending on the traffic control command. The queue for each priority may be the first queue 1521, the second queue 1523, or the third queues 1525 to which network traffic, each of which has a different processing priority, is input in response to a traffic control command of the priority controller 1517. The kernel 1520 may input network traffic of an application according to the first rule group to the first queue 1521 having the highest processing priority and may input network traffic of an application according to second to fourth rule groups to the second queue 1523 having a middle processing priority or the third queue 1525 having the lowest processing priority, depending on a traffic control command. The kernel 1520 may first process network traffic included in the first queue 1521, then process network traffic included in the second queue 1523, and then process network traffic included in the third queue 1525, depending on a traffic control command. If network traffic is received at a queue of a higher priority while network traffic included in a queue with a relatively low priority is processed according to a traffic control command, the kernel 1520 may stop the network traffic of the low priority being processed and may first process the network traffic of the queue of a higher priority. As such, an embodiment of the present disclosure may enhance a speed of network traffic the user feels by controlling a sequential processing order of network traffic and controlling the network traffic in a traffic processing order of the kernel 1520.

According to embodiments, the priority controller 1517 may block network traffic based on a rule according to at least one of first information, such as app information, second information, such as device state information, or third information, such as an application set to a blocked application. As an example, if network traffic of applications arrives at a specified traffic limit, the priority controller 1517 may block the network traffic of the applications. The priority controller 1517 may block network traffic of an application set to a blocked application by the user. If a remaining capacity of a battery is less than a specified remaining capacity from second information, such as device state information, the priority controller 1517 may block the remaining network traffic except for network traffic generated by an application according to the rule of the first rule group. If verifying that a power-saving mode is selected from the third information, the priority controller 1517 may block network traffic generated by applications according to the remaining rules except for an application according to the first rule group. If verifying that an ultra power-saving mode is selected from the third information, the priority controller 1517 may block network traffic generated by the remaining applications except for an application, such as a real-time application, according to a rule of the highest priority in the first rule group. If a heating temperature of the electronic device 1000 is greater than or equal to a specific threshold value, the priority controller 1517 may block network traffic generated by the remaining applications except for an application specified according to a rule of a fourth rule group, such as an application according to the first rule group. As such, embodiments may enhance a processing speed of network traffic the user feels by quickly processing a network packet of an application with high importance, such as an application which needs real time, an application of bidirectional communication, or an application specified by a manufacturer.

According to embodiments, if blocking network traffic, the priority controller 1517 may display a blocking notification on a display. Further, if the user who verifies the blocking notification requests to process blocked network traffic through the input module 1400, the priority controller 1517 may process the blocked network traffic without blocking the blocked network traffic.

According to embodiments, the priority controller 1517 may transmit a traffic control command and may distribute and adjust a rate of a queue for each priority of the kernel 1520. The priority controller 1517 may distribute a total amount of network traffic of each transceiver to the first to third queues 1521, 1523, and 1525 at a default rate. For example, the default distribution rates of the first to third queues 1521, 1523, and 1525 may be 10%, 30%, and 60%, respectively. The priority controller 1517 may increase a rate of the first queue 1521 depending on an amount of network traffic to be assigned to the first queue 1521. In this case, the priority controller 1517 may reduce the ratio of a second queue 1523 to a third queue 1525 as much as the rate of the first queue 1521 is increased. The reduction ratio of the second queue 1523 to the third queue 1525 according to the increase of the first queue 1521 may be specified by a performance test of traffic control or the like. As such, an embodiment of the present disclosure may ensure priority processing of the most important network traffic, such as network traffic according to the first rule group.

Figure 4:
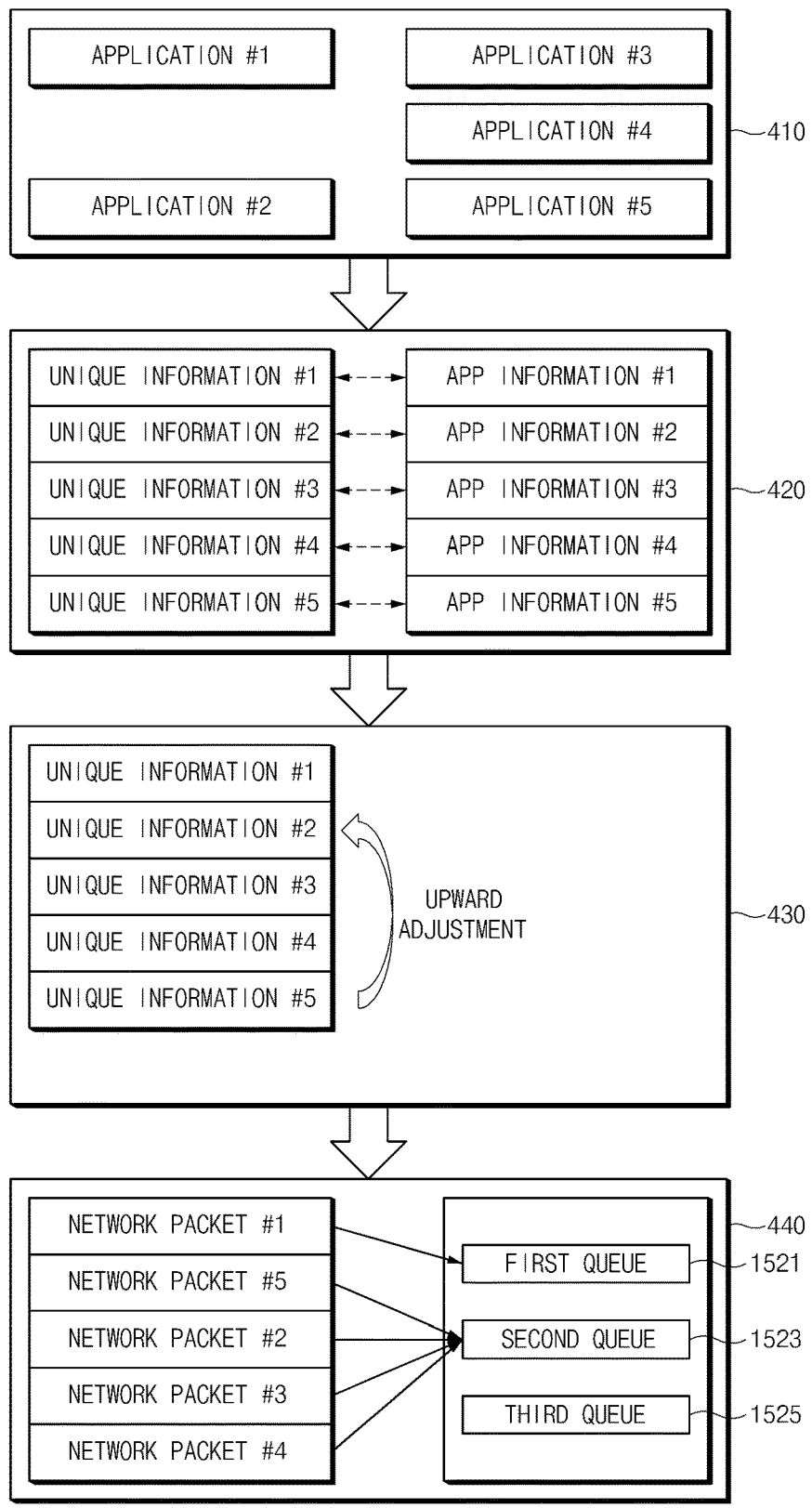
FIG. 4 illustrates a process of arranging network traffic according to embodiments of the present disclosure.

FIG. 4 illustrates a process of arranging network traffic according to embodiments of the present disclosure.

Referring to FIG. 4, in step 410, a first monitoring unit 1511 of FIG. 3 may detect unique information, such as unique information #1 to #5, of an executing application, such as applications #1 to #5. In embodiments, the first monitoring unit 1511 may detect 5 applications which generate network traffic among executing applications and may detect unique information of each of the detected applications. In step 410, an embodiment is exemplified as all the executing applications generate network traffic. In step 420, the first monitoring unit 1511 may verify app information of the five detected applications #1 to #5. The first monitoring unit 1511 may arrange unique information of applications using an amount of generated traffic among app information based on a basic rule group. For example, the first monitoring unit 1511 may arrange the unique information of the applications such that an order where an application which generates a large amount of generated traffic is prior to an order where another application is processed.

In step 430, a priority controller 1517 of FIG. 3 may select rules corresponding to an application from a rule chain based on at least one of app information, device state information, device connection information, or user setting information and may secondarily arrange unique information of the application based on the selected rules. For example, a description will be given of an example in which the priority controller 1517 verifies a specific situation, such as a situation during movement, from the device state information, verifies that application #1 is an application complying with a rule of a first rule group from the app information and the rule chain, verifies that applications #2 to #4 are applications complying with a rule of a third rule group, and verifies that application #5 is an application, such as navigation, of a category corresponding to a situation during movement in the rule of the third rule group. In this case, the priority controller 1517 may maintain an order in which application #1 to which a hidden rule according to the first rule group is applied is processed and may upwardly adjust an order in which application #5 corresponding to a specific situation, such as a situation during movement, is processed to an order subsequent to an order of application #1. In this case, applications #2 to #4 may be relatively low in user preference or may be lower in priority than application #5. As such, the priority controller 1517 may process network traffic of application #5 with a high user preference immediately after network traffic of application #1 according to the first rule group.

In step 440, the priority controller 1517 may transmit network traffic to a kernel 1520 of FIG. 3 in a network traffic order of application #1, application #5, application #2, application #3, and application #4. The priority controller 1517 may transmit a traffic control command to assign each network traffic to any of the first to third queues 1521, 1523, and 1525 of the kernel 1520 when transmitting each network traffic. For example, the priority controller 1517 may transmit a traffic control command to assign network traffic of application #1 to the first queue 1521 and assign network traffic of applications #5, #2, #3, and #4 to the second queue 1523. If verifying excess of a processing limit of the second queue 1523 while assigning network traffic of applications #5, #2, #3, and #4 to the second queue 1523 in order, the priority controller 1517 may assign network traffic to the third queue 1525 from network traffic to be processed after a time when the excess of the processing limit is verified in network traffic of applications #5, #2, #3, and #4.

Figure 5A:
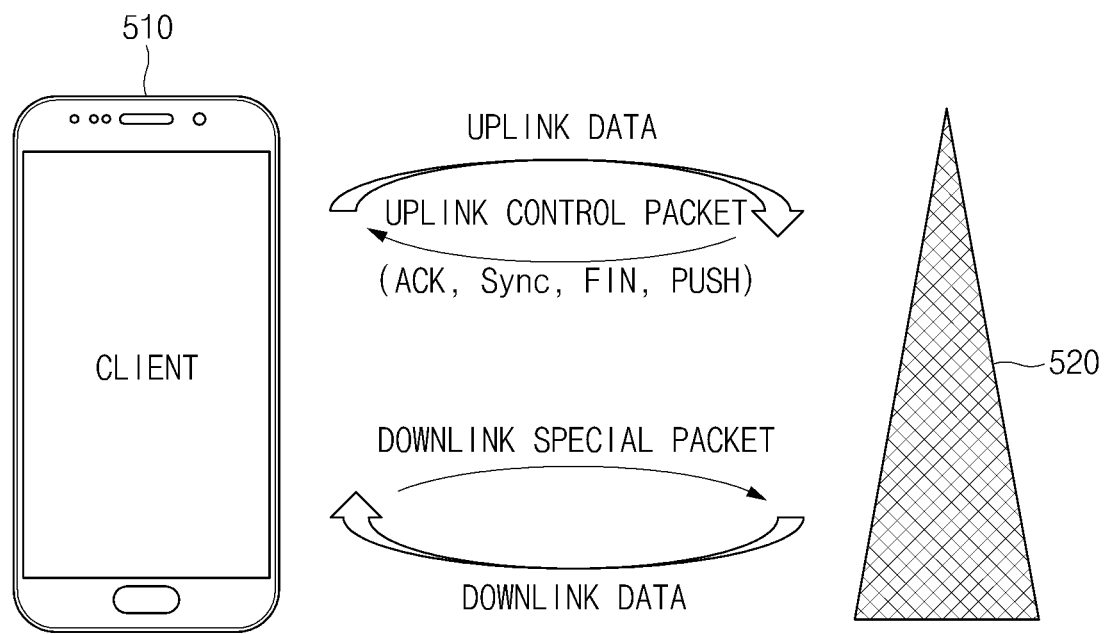
FIG. 5A illustrates TCP/internet protocol (TCP/IP) bidirectional communication between a client and a server according to embodiments of the present disclosure.
Figure 5B:
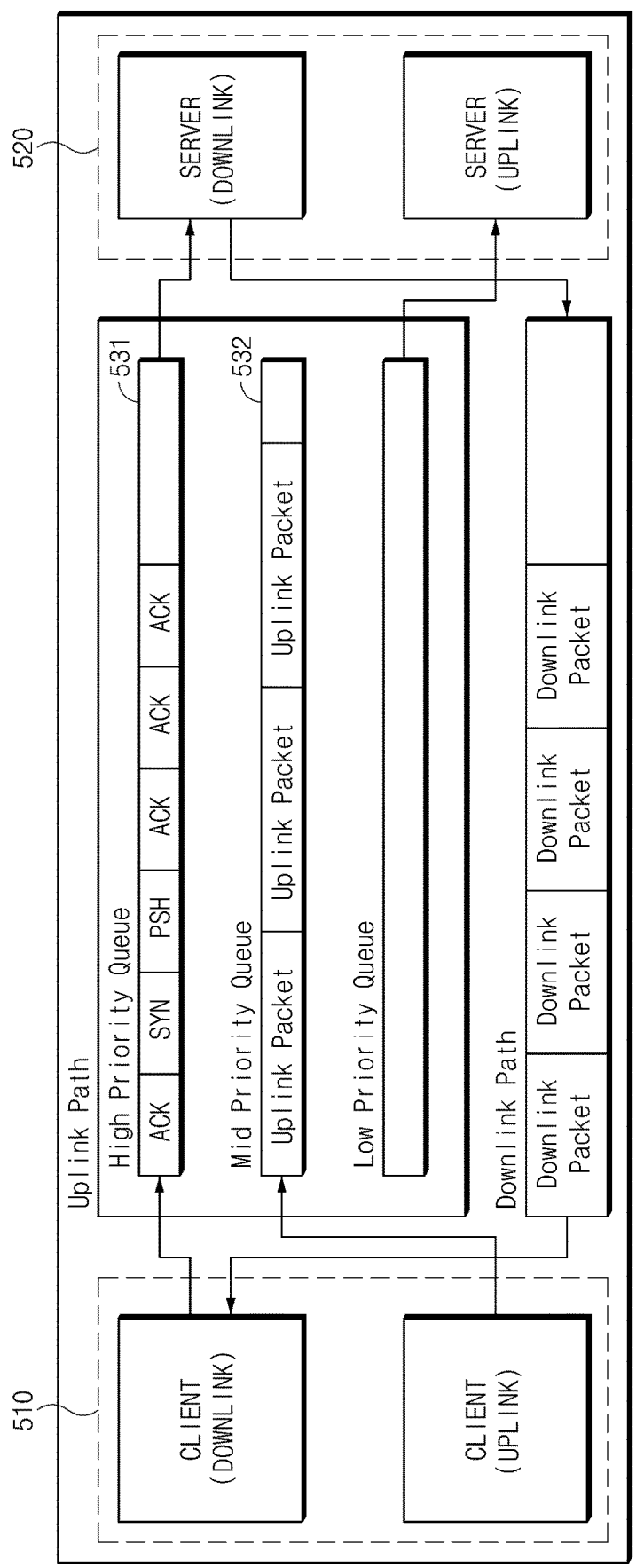
FIG. 5B illustrates packet processing of bidirectional communication according to embodiments of the present disclosure.

FIG. 5A illustrates TCP/internet protocol (TCP/IP) bidirectional communication between a client and a server according to various embodiments of the present disclosure. FIG. 5B illustrates packet processing of bidirectional communication according to embodiments of the present disclosure. In FIG. 5A, an embodiment is exemplified as a client 510 and a server 520 perform wireless communication. However, contrary to this, the client 510 and the server 520 may perform wired communication.

Referring to FIG. 5A, according to embodiments, the client 510 and the server 520 may separately use a downlink and an uplink. For example, the client 510 and the server 520 may divide and use the downlink and the uplink in a manner such as time division or frequency division. In this process, as shown in an arrow of an uplink direction of FIG. 5A, an uplink special packet may be mixed with downlink data which uses the same resource. As shown in an arrow of a downlink direction of FIG. 5A, a downlink special packet, such as ACK, FIN, Sync, or PSH, may be mixed with uplink data which uses the same resource.

Referring to FIG. 5B, according to embodiments, if an electronic device 1000 of FIG. 1A is applied to the client 510, the client 510 may instruct to assign first to third queues 1521, 1523, and 1525 to a kernel 1520 of FIG. 3 to assign network traffic to the first to third queues 1521, 1523, and 1525 arranged for each priority. For example, the client 510 may first transmit a special packet of the downlink to the kernel 1520 such that a special packet of the downlink (or bidirectional communication) is processed prior to data of the uplink to assign the special packet of the downlink to the first queue 1521 which is first processed. Further, a priority controller of the client 510 may transmit data of the uplink to the kernel 1520 after a special packet of the downlink to assign the data of the uplink to the second queue 1523 which is second processed or the third queue 1525 which is third processed upon excess of capacity of the second queue 1523. Thus, an embodiment of the present disclosure may support to increase a TCP/IP communication speed as the server 520 more quickly set TCP/IP communication of the electronic device 1000. In FIG. 5B, an embodiment is exemplified as only the client 510 has a traffic control function. However, contrary to this, the server 520 may have the traffic control function.

According to an embodiment of the present disclosure, an electronic device may include a memory configured to store processing rules of network traffic; and a processor configured to be operatively connected with the memory. The processor is configured to: verify at least one of app information of an application corresponding to at least one process which causes the network traffic, device state information, or network packet information; and determine an order where the network traffic is processed, based on a rule to be applied, the rule corresponding to the at least one information, among the processing rules.

The app information may include at least one of an amount of traffic generated from the application corresponding to the at least one process, an execution state of the application, real time of the application, a network protocol of the application, or a category of the application.

The processing rule may include a first rule of assigning an order where network traffic is processed to a process with a larger amount of generated traffic in a relatively faster processing order, and wherein the processor is configured to: assign an order where network traffic of an application with a relatively large amount of generated traffic is processed in a relatively fast processing order depending on the first rule.

The processing rule may include a first rule of assigning a faster processing order than network traffic of a second application unnecessary for ensuring real time to network traffic of a first application necessary for ensuring the real time, and the processor is configured to assign a faster processing order than the network traffic of the second application to the network traffic of the first application in the network traffic depending on the first rule.

The processing rule may include a first rule of assigning a faster processing order than a packet of other network traffic to a special packet for controlling a network protocol, and the processor is configured to, if verifying the special packet from the network traffic, assign a faster processing order than the packet of the other network traffic to the verified special packet depending on the first rule.

The processing rule may include if an execution state of the application is a foreground state, a first rule of assigning a faster processing order than an application of a background state to the application of the foreground state, and the processor is configured to assign a faster processing order than the application of the background state to the application of the foreground state depending on the first rule.

According to an embodiment, the electronic device may further include a sensor module configured to sense the device state information, wherein the device state information comprises at least one of location information, acceleration information, or information about a remaining capacity of a battery of the electronic device, and wherein the processor is configured to verify at least one of the location information, the acceleration information, or information indicating that the remaining capacity of the battery is less than or equal to a specified value, using sensing information from the sensor module.

The processing rule may include a first rule of assigning a relatively fast processing order to network traffic corresponding to a favorite category or a favorite application, and the processor is configured to, if verifying network traffic generated from the favorite category or the favorite application from the app information, assign a relatively fast processing order to the verified network traffic depending on the first rule.

The device state information may include location information or acceleration information, and wherein the processing rule may include a first rule of assigning a relatively fast processing order to network traffic of an application of a specified category with respect to a specific situation including at least one of a situation during movement or a situation during exercise, and the processor is configured to, if verifying the specific situation from at least one of the location information or the acceleration information, assign a relatively fast processing order to the application of the specified category with respect to the specific situation depending on the first rule.

According to an embodiment, the electronic device may further include a communication module configured to communicate with a peripheral device, wherein the processing rule may include a first rule of assigning a relatively fast processing order to network traffic of an application which communicates with the peripheral device, and wherein the processor is configured to, if verifying that the electronic device is connected with the peripheral device from communication information from the communication module, assign a relatively fast processing order to the network traffic of the application which communicates with the peripheral device depending on the first rule.

The device state information may include information about a remaining capacity of a battery of the electronic device wherein the processing rule may include if the remaining capacity of the battery is less than or equal to a specified value, a first rule of blocking network traffic except for network traffic generated from a specified application, and the processor is configured to, if verifying that the remaining capacity of the battery is less than or equal to the specified value from the device state information, block the network traffic except for the network traffic of the specified application depending on the first rule.

The specified application may include a first application necessary for ensuring real time; a second application for transmitting a special packet for controlling a network protocol in network traffic of an application for performing bidirectional communication; and a third application specified by an operator.

According to an embodiment, the electronic device may further include an input module, wherein the processing rule may include if at least one of a car mode, a kids mode, or a private or guest mode is set, a first rule of assigning a relatively fast processing order to network traffic of a first application configured to be operated in the at least one mode, and wherein the processor is configured to, if the at least one mode is set through the input module, assign a relatively fast processing order to the network traffic of the first application configured to be operated in the at least one mode, depending on the first rule.

The processing rule may include a first rule of assigning the network traffic to a queue corresponding to the application among a plurality of queues, wherein each of the plurality of queues has a priority different from another queue, and the processor is configured to determine a queue, to which a packet according to the network traffic will be assigned, using the app information; and assign the packet to the determined queue.

The processor is configured to first process a packet assigned to a queue with a relatively high priority among the plurality of queues.

The processor is configured to adjust a capacity of each of the plurality of queues based on an amount of the network traffic assigned to each of the plurality of queues.

The processing rule may include a first rule of assigning network packets of a plurality of peripheral devices connected to the electronic device to the plurality of queues in an order of a preference according to a user input, and the processor is configured to primarily assign the network packets of the plurality of peripheral devices to a queue with a high priority among the plurality of queues depending on the first rule.

Figure 5C:
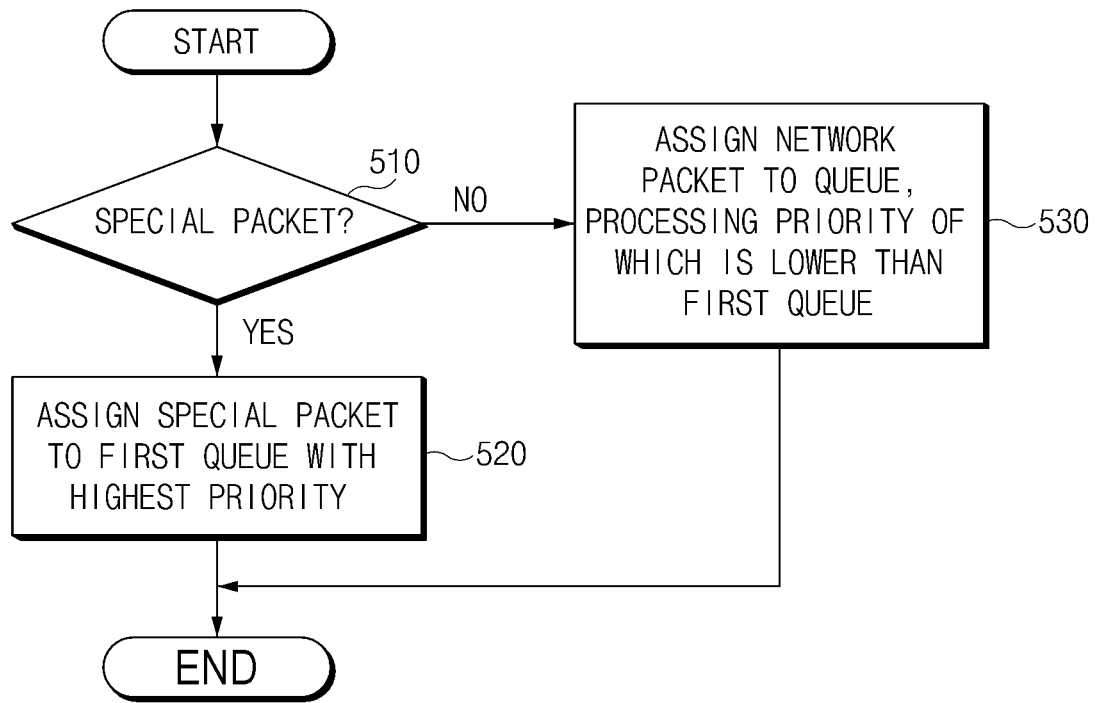
FIG. 5C is a flowchart illustrating a method for processing a packet of another bidirectional communication according to embodiments of the present disclosure.

FIG. 5C is a flowchart illustrating a method for processing a packet of another bidirectional communication according to embodiments of the present disclosure.

Referring to FIG. 5C, in step 510, a processor 1500, such as a traffic controller 1510 of FIG. 1A may verify data information such as header information and/or a payload of a network packet, such as a TCP data packet. The processor 1500 may verify whether the packet is a specific packet based on the verified information. In an embodiment, the specific packet may be a packet for controlling a network protocol and may be selected among packets transmitted to a network at the processor 1500 to adjust (or optimize) a data throughput. For example, the specific packet may be a packet, a header of which includes a control flag (e.g., URG, ACK, PSH, RST, SYN, FIN, or the like), or a packet reserved by an application. The specific packet may be a data packet of a specific category, such as a voice over Internet protocol (VoIP) packet and/or a streaming data packet. In step 520, if verifying that the network packet is the specific packet, the processor 1500 may assign the specific packet to a queue, such as a first queue 1521 or a second queue 1523 of FIG. 3, with a high processing priority among a plurality of queues. For example, the processor 1500 may assign the specific packet to the first queue 1521 with the highest processing priority.

In step 530, if verifying that the network packet is not the specific packet, the processor 1500 may assign the network packet to a queue, such as the second queue 1523 or a third queue 1525, with a lower processing priority than the first queue 1521. Thus, embodiments of the present disclosure may increase a network speed by primarily processing a specific packet for adjusting a network throughput.

Figure 6:
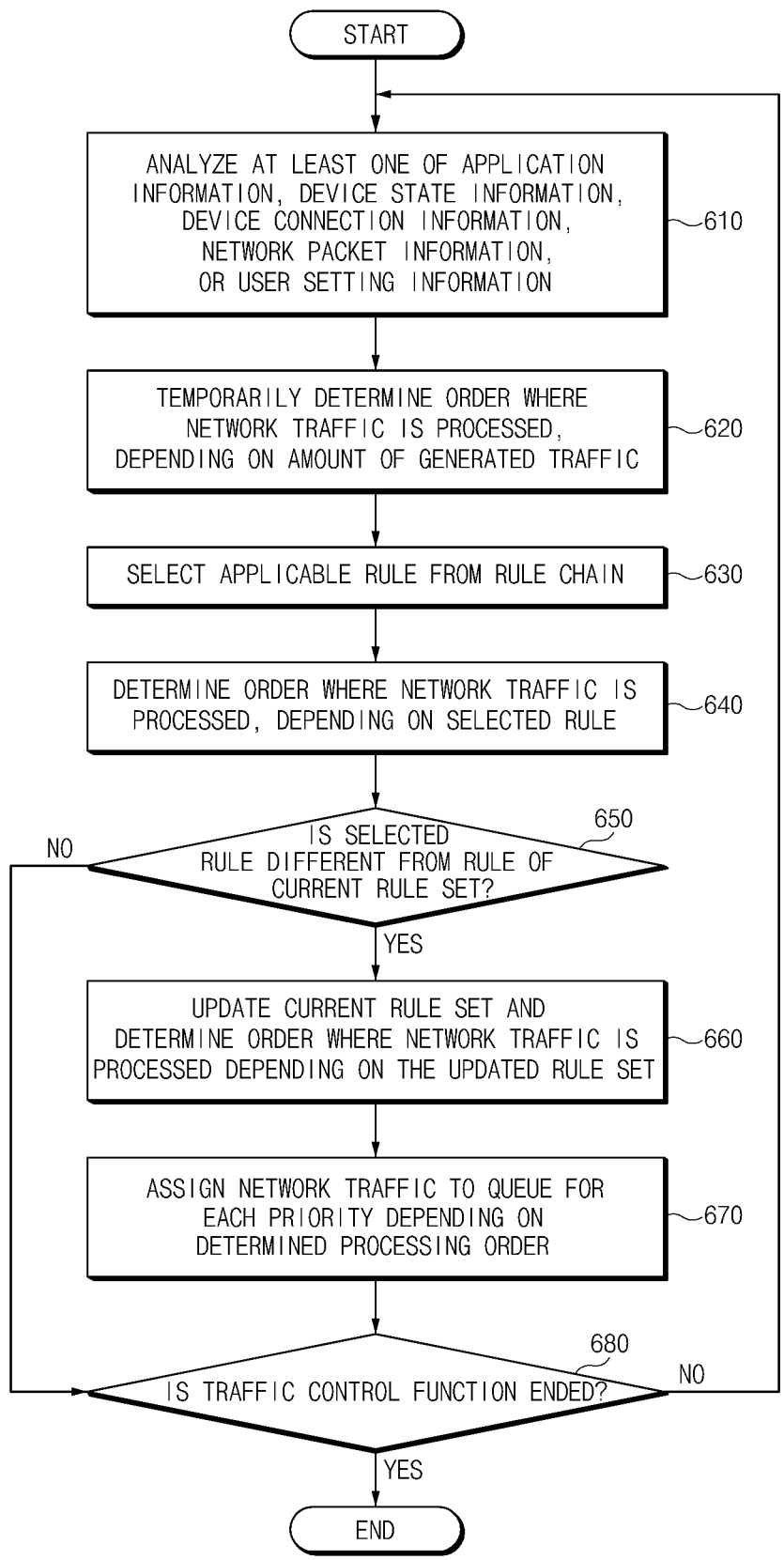
FIG. 6 is a flowchart illustrating a priority control method according to embodiments of the present disclosure.

FIG. 6 is a flowchart illustrating a priority control method according to embodiments of the present disclosure.

Referring to FIG. 6, in step 610, a traffic controller 1510 of FIG. 1A may analyze at least one of an application, device state information, device connection information, network packet information, or user setting information. If verifying an application which generates network traffic among applications, the traffic controller 1510 may analyze app information. The app information may include at least one of an amount of traffic generated by the application, an execution state of the application, a characteristic of the application, a type of the application, or a category of the application. The traffic controller 1510 may verify at least one of a specific situation, a specific location, a specific mode, a low battery, whether network traffic arrives at a traffic limit, or whether a peripheral device is connected, using at least one of sensing information from a sensor module 1300 of FIG. 1A or communication information from a communication module 1200 of FIG. 1A. The traffic controller 1510 may verify a user setting for a favorite function including at least one of a favorite category, a peripheral device a user prefers, or a favorite application for each location, through the input module 1400.

In step 620, the traffic controller 1510 may temporarily determine an order where network traffic of an application is processed. The traffic controller 1510 may determine the order where the network traffic of the application is processed, in an order where there is a large amount of generated traffic, depending on a rule of a basic rule group. The traffic controller 1510 may arrange unique information of an application in the processing order.

In step 630, the traffic controller 1510 may select rules (applicable rules) associated with an application which generates network traffic from first to fourth rule groups. The traffic controller 1510 may select a rule corresponding to app information from the first to fourth rule groups with reference to the app information of an application. For example, if the app information corresponds to at least one of a specific situation, a specific location, a specific mode, a low battery, whether network traffic arrives at a traffic limit, whether a peripheral device is connected, a favorite category, a peripheral device the user prefers, or a favorite application for each location in the first to fourth rule groups, the traffic controller 1510 may select a rule corresponding to the at least one information.

In step 640, the traffic controller 1510 may change the order where the network traffic is processed, in consideration of the selected rule. Since the description is given above of the process of changing the processing order at the traffic controller 1510, a detailed description will be omitted.

In step 650, the traffic controller 1510 may compare the selected rule with a rule according to a current rule set stored in a memory 1100 of FIG. 1A to determine whether the selected rule is different from the rule according to the current rule set.

If the selected rule is different from the rule according to the current rule set, in step 660, the traffic controller 1510 may add the selected rule to the current rule set or may delete a rule, which is not included in the selected rule, from the current rule set, for example, may update the current rule set stored in the memory 1100. In step 660, the traffic controller 1510 may change an order where network traffic is processed, depending on the rule of the current rule set.

In step 670, the traffic controller 1510 may generate and transmit a traffic control command to assign network traffic to a queue for each priority in the changed processing order. For example, the traffic controller 1510 may generate a traffic control command to transmit network traffic to a kernel 1520 of FIG. 3 in the changed processing order and assign the network traffic to a queue for each priority of the specified kernel 1520 with respect to each application.

In step 680, the traffic controller 1510 may determine whether a traffic control function is ended. The traffic controller 1510 may repeatedly perform steps 610 to 670 until the traffic control function is ended. The traffic control function may be performed on a periodic basis. In embodiments, step 680 may be omitted. For example, the electronic device 1000 may always use the traffic control function during execution.

Figure 7:
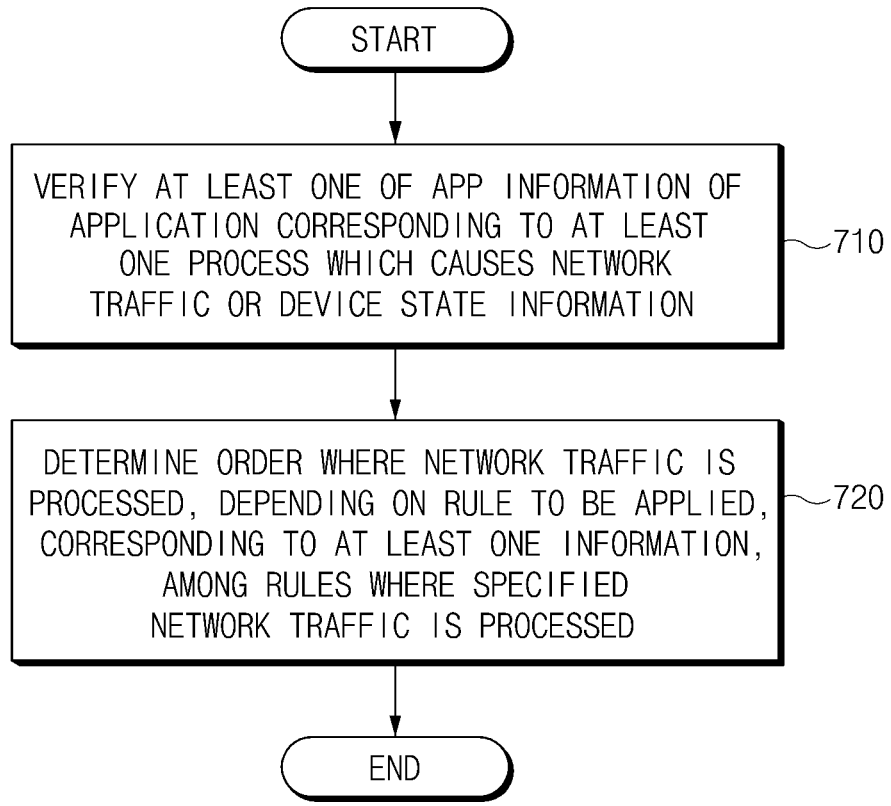
FIG. 7 is a flowchart illustrating a traffic control method according to embodiments of the present disclosure.

FIG. 7 is a flowchart illustrating a traffic control method according to embodiments of the present disclosure.

Referring to FIG. 7, in step 710, a traffic controller 1510 of FIG. 1A may verify at least one of an application, device state information, device connection information, network packet information, or user setting information. If verifying an application which generates network traffic among applications, the traffic controller 1510 may verify (analyze) app information. The app information may include at least one of an amount of traffic generated by the application, an execution state of the application, a characteristic of the application, a type of the application, or a category of the application. The traffic controller 1510 may verify at least one of a specific situation, a specific location, a specific mode, a remaining capacity of a battery, whether network traffic arrives at a traffic limit, or a peripheral device is connected, using sensing information from a sensor module 1300 or communication information from a communication module 1200 of FIG. 1A. The traffic controller 1510 may verify a user setting for a favorite function including at least one of a favorite category, a peripheral device a user prefers, or a favorite application for each location, through the input module 1400. In embodiments of the present disclosure, step 710 may be omitted.

In step 720, the traffic controller 1510 may determine an order where network traffic of an application is processed. The traffic controller 1510 may determine an order where network traffic of each application is processed, as an order where there is a large amount of generated traffic depending on a rule of a basic rule group.

Thereafter, the traffic controller 1510 may generate and transmit a traffic control command to assign network traffic to a queue for each priority in the determined processing order. For example, the traffic controller 1510 may generate a traffic control command to transmit network traffic to a kernel 1520 of FIG. 3 in an arranged order and assign the network traffic to a queue for each priority of the specified kernel 1520 with respect to each application.

In the embodiment described above, the traffic controller 1510 may perform steps 710 and 720 and a subsequent step on a periodic basis. Embodiments of the present disclosure may increase a traffic speed a user feels by more quickly processing network traffic of an application with a high frequency of use, such as an application with a high amount of generated traffic.

An electronic device 1000 of FIG. 1A may include a memory configured to store a processing rule of network traffic and a processor configured to assign a processing order, which is quicker than a packet of other network traffic, to a special packet if verifying the special packet for controlling a network protocol using network packet data, such as header information, depending on the processing rule.

According to an embodiment, a TCP data traffic control method by at least one processor is provided. The method may include verifying a TCP data packet corresponding to at least one process; if the TCP data packet is a special packet for controlling a network protocol, assigning a faster network processing order than another packet to the special packet; and if the TCP data packet is not the special packet, assigning a slower network processing order than the special packet to the TCP data packet.

Figure 8:
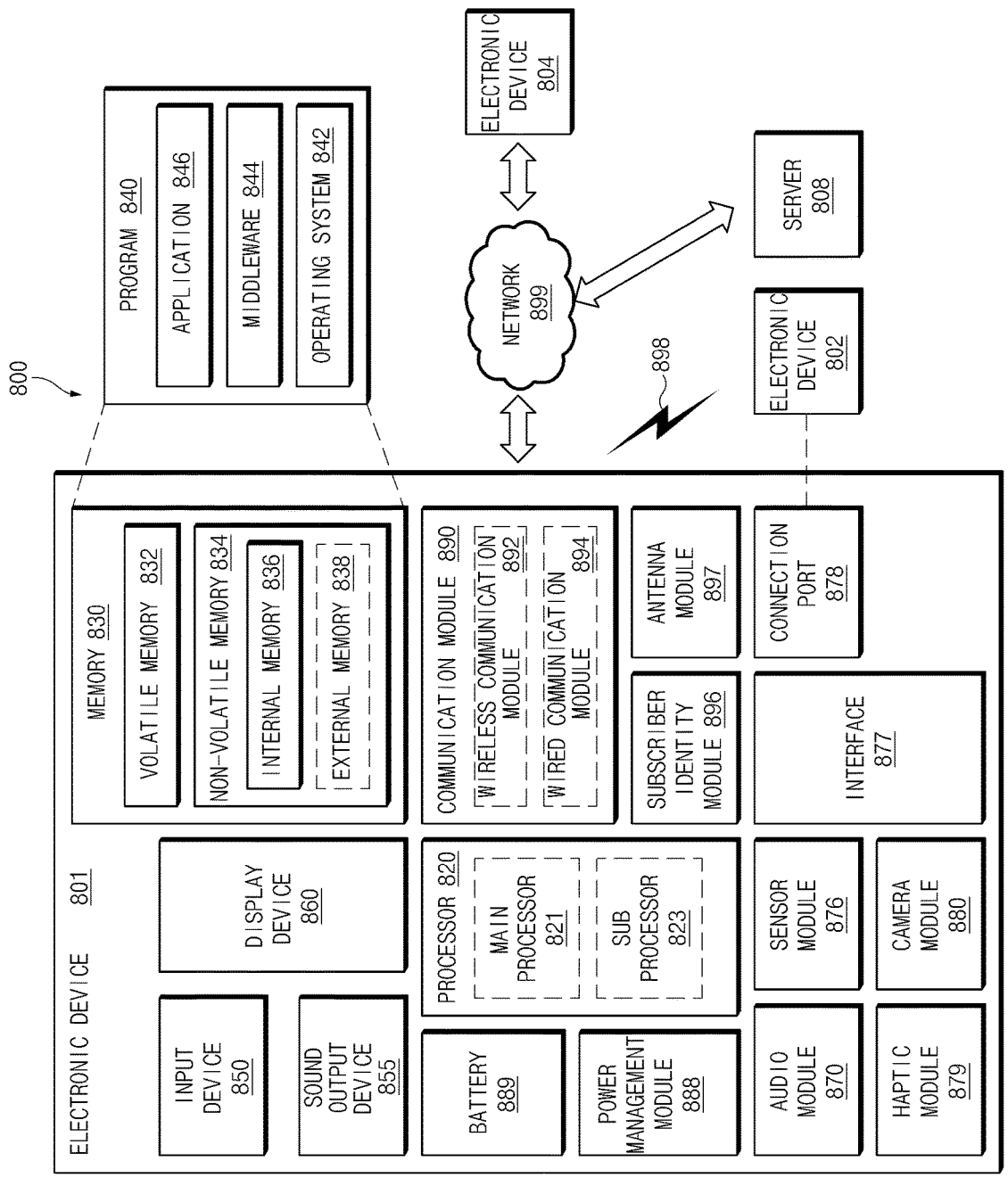
FIG. 8 is a block diagram illustrating a configuration of an electronic device for controlling traffic in a network environment according to embodiments.

FIG. 8 is a block diagram of an electronic device in a network environment according to embodiments of the present disclosure.

FIG. 8 illustrates an electronic device 801 in a network environment 800. According to embodiments disclosed in the present disclosure, the electronic device 801 may include various types of devices. For example, the electronic device 801 may include at least one of a portable communication device, such as a smartphone, a computer device such as a personal digital assistant (PDA), a tablet personal computer (PC), a laptop PC, a desktop PC, a workstation, or a server, a portable multimedia device, such as an e-book reader or an motion picture experts group (MPEG-1 or MPEG-2), audio layer 3 (MP3) player, a portable medical device, such as a heart rate monitor, blood glucose monitor, blood pressure monitor, or a thermometer, a camera, or a wearable device. A wearable device may include at least one of an accessory type of a device, such as a timepiece, a ring, a bracelet, an anklet, a necklace, glasses, a contact lens, or a head-mounted device (HMD), one-piece fabric or clothes type of a device, such as electronic clothes, a body-attached type of a device, such as a skin pad or a tattoo, or a bio-implantable circuit. The electronic device may include at least one of: televisions (TVs), digital versatile disc (DVD) players, audios, audio accessory devices, such as a speaker, a headphone, or a headset, a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR), such as a black box for a car, a ship, or a plane, a vehicle infotainment device, such as a head-up display for a vehicle, an industrial or home robot, a drone, an automated teller machine (ATM), a point of sales (POS) device, a measurement device, such as a water meter, an electricity meter, or a gas meter, or an Internet of things device, such as a light bulb, a sprinkler device, a fire alarm, a thermostat, or a street lamp.

The electronic device is not limited to the above-described devices. For example, similar to a smartphone having function of measuring personal bio-information, such as heart rate or blood glucose, the electronic device may complexly provide functions of multiple devices. In the present disclosure, the term "user" used herein may refer to a person who uses the electronic device or may refer to a device, such as an artificial intelligence electronic device, that uses the electronic device.

Referring to FIG. 8, under the network environment 800, the electronic device 801 may communicate with an electronic device 802 through local wireless communication 898 or may communicate with an electronic device 804 or a server 808 through a network 899. The electronic device 801 may communicate with the electronic device 804 through the server 808.

According to an embodiment, the electronic device 801 may include a bus 810, a processor 820, a memory 830, an input device 850, such as a microphone or a mouse, a display 860, an audio module 870, a sensor module 876, an interface 877, a haptic module 879, a camera module 880, a power management module 888, a battery 889, a communication module 890, and a subscriber identification module 896. The electronic device 801 may not include at least one element, such as the display 860 or the camera module 880, of the above-described elements or may further include other element(s).

For example, the bus 810 may interconnect the above-described elements 820 to 890 and may include a circuit for conveying signals, such as a control message or data, between the above-described elements. The processor 820 may include one or more of a CPU, an application processor (application), a GPU, a camera image signal processor (ISP) of a camera or a communication processor (CP). According to an embodiment, the processor 820 may be implemented with a system on chip (SoC) or a system in package (SiP). For example, the processor 820 may drive an operating system (OS) or an application to control at least one of another element, such as hardware or software element, connected to the processor 820 and may process and compute various data. The processor 820 may load an instruction or data, which is received from at least one of other elements, such as the communication module 890, into a nonvolatile memory 832 to process the instruction or data and may store the process result data into the nonvolatile memory 834.

The memory 830 may include a volatile memory 832 or a nonvolatile memory 834. The volatile memory 832 may include a random access memory (RAM) (e.g., a dynamic random access memory (DRAM), a static RAM (SRAM), or a synchronous dynamic RAM (SDRAM)). The nonvolatile memory 834 may include one time programmable read-only memory (OTPROM), programmable read-only memory (PROM), an erasable programmable read-only memory (EPROM), an electrically erasable programmable read-only memory (EEPROM), a mask ROM, a flash ROM, a flash memory, a hard drive, or a solid-state drive (SSD). In addition, the nonvolatile memory 834 may be configured in the form of an internal memory 836 or the form of an external memory 838 which is available through connection only if necessary, according to the connection forms of the electronic device 801. The external memory 838 may further include a flash drive such as compact flash (CF), secure digital (SD), micro secure digital (micro-SD), mini secure digital (mini-SD), extreme digital (xD), a multimedia card (MMC), or a memory stick. The external memory 838 may be operatively or physically connected with the electronic device 801 in a wired manner, such as by a cable or a universal serial bus (USB), or in a wireless, or Bluetooth (BT) manner.

For example, the memory 830 may store at least one different software element, such as an instruction or data associated with the program 840, of the electronic device 801. The program 840 may include a kernel 841, a library 843, an application framework 845, or an application 847.

The input device 850 may include a microphone, a mouse, or a keyboard. According to an embodiment, the keyboard may include a keyboard physically connected or a keyboard virtually displayed through the display 860.

The display 860 may include a display, a hologram device or a projector, and a control circuit to control a relevant device. The screen may include a liquid crystal display (LCD), a light emitting diode (LED) display, an organic LED (OLED) display, a plastic OLED (POLED), a micro-electromechanical systems (MEMS) display, or an electronic paper display. According to an embodiment, the display may be flexibly, transparently, or wearably implemented. The display may include a touch circuitry, which is able to detect a user's touch input such as a gesture input, a proximity input, or a hovering input or a pressure sensor (or a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 801.

The audio module 870 may convert a sound into an electrical signal or an electrical signal into the sound. According to an embodiment, the audio module 870 may acquire sound through the input device 850, such as a microphone, or may output sound through an output device, such as a speaker or a receiver, included in the electronic device 801, electronic device 802, such as a wireless speaker or a wireless headphone, or an electronic device 806, such as a wired speaker or a wired headphone, connected with the electronic device 801.

The sensor module 876 may measure or detect an internal operating state, such as power or temperature, or an external environment state, such as an altitude, a humidity, or brightness, of the electronic device 801 to generate an electrical signal or a data value corresponding to the information of the measured state or the detected state. The sensor module 876 may include at least one of a gesture sensor, a gyro sensor, a barometric pressure sensor, a magnetic sensor, an acceleration sensor, a grip sensor, a proximity sensor, a color sensor, such as a red, green, blue (RGB) sensor, an infrared sensor, a biometric sensor, such as an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 876 may further include a control circuit for controlling at least one or more sensors included therein. The sensor module 876 may be controlled by using the processor 820 or a processor separate from the processor 820. In the case that the separate processor, such as a sensor hub, is used, while the processor 820 is in a sleep state, the separate processor may operate, without awakening the processor 820, to control at least a portion of the operation or the state of the sensor module 876.

According to an embodiment, the interface 877 may include a high definition multimedia interface (HDMI), a USB, an optical interface, a recommended standard 232 (RS-232), a D-subminiature (D-sub), a mobile high-definition link (MHL) interface, a SD card/MMC (multi-media card) interface, or an audio interface. A connector 878 may physically connect the electronic device 801 and the electronic device 806. The connector 878 may include a USB connector, an SD card/MMC connector, or an audio connector, such as a headphone connector.

The haptic module 879 may convert an electrical signal into mechanical stimulation, such as a vibration or motion, or into electrical stimulation. For example, the haptic module 879 may apply tactile or kinesthetic stimulation to a user. The haptic module 879 may include a motor, a piezoelectric element, or an electric stimulator.

The camera module 880 may capture a still image and a moving picture. According to an embodiment, the camera module 880 may include at least one lens, such as a wide-angle lens and a telephoto lens, or a front lens and a rear lens, an image sensor, an ISP, or a flash, such as a light emitting diode or a xenon lamp.

The power management module 888, which manages the power of the electronic device 801, may constitute at least a portion of a power management integrated circuit (PMIC).

The battery 889 may include a primary cell, a secondary cell, or a fuel cell and may be recharged by an external power source to supply power at least one element of the electronic device 801.

The communication module 890 may establish a communication channel between the electronic device 801 and an external device, 802 or 804, or the server 808. The communication module 890 may support wired communication or wireless communication through the established communication channel According to an embodiment, the communication module 890 may include a wireless communication module 892 or a wired communication module 894. The communication module 890 may communicate with the external device through a first network 898 (e.g., a wireless local area network (LAN), Bluetooth (BT), or Infrared Data Association (IrDA)) or a second network 899 (e.g., a wireless wide area network such as a cellular network) through a relevant module among the wireless communication module 892 or the wired communication module 894.

The wireless communication module 892 may support cellular communication, local wireless communication, or GNSS communication. The cellular communication may include, LTE, LTE advance (LTE-A), code division multiple access (CMA), wideband CDMA (WCDMA), universal mobile telecommunications system (UMTS), wireless broadband (WiBro), or GSM. The local wireless communication may include wireless fidelity (Wi-Fi), WiFi Direct, light fidelity, Bluetooth, Bluetooth low energy (BLE), Zigbee, near field communication (NFC), magnetic secure transmission (MST), radio frequency (RF), or a body area network (BAN). The GNSS may include at least one of GPS, Glonass, Beidou navigation satellite system (Beidou) or Galileo, the European global satellite-based navigation system, or the like. In the present disclosure, "GPS" and "GNSS" may be interchangeably used.

According to an embodiment, when the wireless communication module 892 supports cellar communication, the wireless communication module 892 may identify or authenticate the electronic device 801 within a communication network using the subscriber identification module, such as a SIM card 896. The wireless communication module 892 may include the processor 820, such as an AP or CP. In this case, the CP may perform at least a portion of functions associated with at least one of elements 810 to 896 of the electronic device 801 in substitute for the processor 820 when the processor 820 is in an inactive (sleep) state, and together with the processor 820 when the processor 820 is in an active state. According to an embodiment, the wireless communication module 892 may include a plurality of communication modules, each supporting only a relevant communication scheme among cellular communication, short-range wireless communication, or a GNSS communication scheme.

The wired communication module 894 may include a local area network (LAN) service, a power line communication, or a plain old telephone service (POTS).

For example, the first network 898 may employ WiFi direct or Bluetooth for transmitting or receiving instructions or data through wireless direct connection between the electronic device 801 and the first external electronic device 802. The second network 899 may include a telecommunication network, such as a computer network such as a LAN or a WAN, the Internet or a telephone network, for transmitting or receiving instructions or data between the electronic device 801 and the second electronic device 804.

According to embodiments, the instructions or the data may be transmitted or received between the electronic device 801 and the second external electronic device 804 through the server 808 connected with the second network. Each of the external first and second external electronic devices 802 and 804 may be a device of which the type is different from or the same as that of the electronic device 801. All or a part of operations that the electronic device 801 will perform may be executed by another or a plurality of electronic devices, such as the electronic devices 802 and 804 or the server 808. In the case that the electronic device 801 executes any function or service automatically or in response to a request, the electronic device 801 may not perform the function or the service internally, but may additionally transmit requests for at least a part of a function associated with the electronic device 801 to another device, such as the electronic device 802 or 804 or the server 808. The another electronic device 802 or 804, or the server 808 may execute the requested function or additional function and may transmit the execution result to the electronic device 801. The electronic device 801 may provide the requested function or service using the received result or may additionally process the received result to provide the requested function or service. To this end, cloud computing, distributed computing, or client-server computing may be used. The term "module" as used in the present disclosure may indicates a unit including one or more combinations of hardware, software and firmware. The term "module" may be interchangeably used with the terms "unit", "logic", "logical block", "component" and "circuit", may be a minimum unit of an integrated component or may be an integrally configured part, may be a minimum unit for performing one or more functions, and may be implemented mechanically or electronically. For example, the "module" may include at least one of an application-specific IC (ASIC) chip, a field-programmable gate array (FPGA), and a programmable-logic device for performing some operations, which is known or will be developed.

At least a part of an apparatus or a method according to an embodiment of the present disclosure may be implemented by instructions stored in a computer-readable storage media in the form of a program module. The instruction, when executed by a processor 820, may cause the one or more processors to perform a function corresponding to the instruction. The computer-readable storage media may be the memory 830.

A computer-readable recording medium may include a hard disk, a floppy disk, a magnetic media, such as a magnetic tape, an optical media, such as a compact disc read only memory (CD-ROM) and a digital versatile disc (DVD), a magneto-optical media, such as a floptical disk, and hardware devices, such as a read only memory (ROM), a random access memory (RAM), or a flash memory. The program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
  a memory storing processing rules of network traffic; and
  a processor operatively connected with the memory, and configured to:
  verify at least one information element of app information of an application corresponding to at least one process which causes the network traffic, device state information, or network packet information,
  determine an order by which the network traffic is processed, based on a rule to be applied, the rule corresponding to the at least one information element, among the processing rules,
  assign packets of the network traffic to a first queue among a plurality of queues based on the order, wherein the plurality of queues corresponds to different priorities,
  when the first queue is full, assign the packets of the network traffic to a second queue among the plurality of queues, wherein the second queue is configured with a lower priority than the first queue, and
  wherein the processor is further configured to dynamically change a ratio of the packets assigned to the plurality of queues based on a quantity of the network traffic associated with the first queue.

2. The electronic device of claim 1, wherein the app information comprises at least one of an amount of traffic generated from the application corresponding to the at least one process, an execution state of the application, real time of the application, a network protocol of the application, or a category of the application.

3. The electronic device of claim 1, wherein the processing rule comprises:
  a first rule of assigning an order by which network traffic is processed to a process with a larger amount of generated traffic in a relatively faster processing order, and
  wherein the processor is further configured to:
  assign an order where network traffic of an application with a relatively large amount of generated traffic is processed in a relatively fast processing order depending on the first rule.

4. The electronic device of claim 1, wherein the processing rule comprises:
  a first rule of assigning a faster processing order than network traffic of a second application unnecessary for ensuring real time to network traffic of a first application necessary for ensuring the real time, and
  wherein the processor is further configured to:
  assign the faster processing order than the network traffic of the second application to the network traffic of the first application in the network traffic depending on the first rule.

5. The electronic device of claim 1, wherein the processing rule comprises:

a first rule of assigning a faster processing order than a packet of other network traffic to a special packet for controlling a network protocol, and wherein the processor is further configured to:

if verifying the special packet from the network traffic, assign the faster processing order than the packet of the other network traffic to the verified special packet depending on the first rule.

6. The electronic device of claim 1, wherein the processing rule comprises:

if an execution state of the application is a foreground state, a first rule of assigning a faster processing order than an application of a background state to the application of the foreground state, and wherein the processor is further configured to:

assign the faster processing order than the application of the background state to the application of the foreground state depending on the first rule.

7. The electronic device of claim 1, further comprising:

a sensor module configured to sense the device state information, wherein the device state information comprises at least one of location information, acceleration information, or information about a remaining capacity of a battery of the electronic device, and wherein the processor is further configured to:

verify at least one of the location information, the acceleration information, or information indicating that the remaining capacity of the battery is less than or equal to a specified value, using sensing information from the sensor module.

8. The electronic device of claim 1, wherein the processing rule comprises:

a first rule of assigning a relatively fast processing order to network traffic corresponding to one of a favorite category and a favorite application, and wherein the processor is further configured to:

if verifying network traffic generated from the favorite category or the favorite application from the app information, assign the relatively fast processing order to the verified network traffic depending on the first rule.

9. The electronic device of claim 1, wherein the device state information comprises one of location information and acceleration information, and wherein the processing rule comprises:

a first rule of assigning a relatively fast processing order to network traffic of an application of a specified category with respect to a specific situation including at least one of a situation during movement and a situation during exercise, and wherein the processor is further configured to:

if verifying the specific situation from at least one of the location information or the acceleration information, assign the relatively fast processing order to the application of the specified category with respect to the specific situation depending on the first rule.

10. The electronic device of claim 1, further comprising:

a communication module configured to communicate with a peripheral device, wherein the processing rule comprises:

a first rule of assigning a relatively fast processing order to network traffic of an application which communicates with the peripheral device, and wherein the processor is further configured to:

if verifying that the electronic device is connected with the peripheral device from communication information from the communication module, assign the relatively fast processing order to the network traffic of the application which communicates with the peripheral device depending on the first rule.

11. The electronic device of claim 1, wherein the device state information comprises information about a remaining capacity of a battery of the electronic device, wherein the processing rule comprises:

if the remaining capacity of the battery is less than or equal to a specified value, a first rule of blocking network traffic except for network traffic generated from a specified application, and wherein the processor is further configured to:

if verifying that the remaining capacity of the battery is less than or equal to the specified value from the device state information, block the network traffic except for the network traffic of the specified application depending on the first rule.

12. The electronic device of claim 11, wherein the specified application comprises:

a first application necessary for ensuring real time;

a second application for transmitting a special packet for controlling a network protocol in network traffic of an application for performing bidirectional communication; and a third application specified by an operator.

13. The electronic device of claim 1, further comprising:

an input module, wherein the processing rule comprises:

if at least one of a car mode, a kids mode, and a private or guest mode is set, a first rule of assigning a relatively fast processing order to network traffic of a first application configured to be operated in the at least one mode, and wherein the processor is further configured to:

if the at least one mode is set through the input module, assign the relatively fast processing order to the network traffic of the first application configured to be operated in the at least one mode, depending on the first rule.

14. The electronic device of claim 1, wherein the processing rule comprises:

a first rule of assigning the network traffic to the first queue corresponding to the application among the plurality of queues, wherein the processor is further configured to:

determine a queue, to which a packet according to the network traffic will be assigned, using the app information; and assign the packet to the determined queue.

15. The electronic device of claim 14, wherein the processor is further configured to:

process the packet assigned to a queue with a relatively high priority among the plurality of queues before processing packets assigned to a queue with a relatively low priority.

16. The electronic device of claim 14, wherein the processing rule further comprises:

a first rule of assigning network packets of a plurality of peripheral devices connected to the electronic device to the plurality of queues in an order of a preference according to a user input, and wherein the processor is further configured to:

primarily assign the network packets of the plurality of peripheral devices to a queue with a high priority among the plurality of queues depending on the first rule.

17. A traffic control method by at least one processor, the method comprising:
- verifying at least one information element of app information of an application corresponding to at least one process which causes network traffic or device state information;
- determining an order where the network traffic is processed, depending on a rule to be applied, the rule corresponding to the at least one information element, among processing rules of specified network traffic;
- assigning packets of the network traffic to a first queue among a plurality of queues based on the order, wherein the plurality of queues corresponds to different priorities;
- when the first queue is full, assigning the packets of the network traffic to a second queue among the plurality of queues, wherein the second queue is configured with a lower priority than the first queue; and
- dynamically changing a ratio of the packets assigned to the plurality of queues based on a quantity of the network traffic associated with the first queue.

18. The method of claim 17, wherein the app information comprises at least one of an amount of traffic generated from the application corresponding to the at least one process, an execution state of the application, real time of the application, a network protocol of the application, and a category of the application.

* * * * *